Oct. 14, 1930. W. NOBLE ET AL 1,778,036
VENTILATING SYSTEM
Filed Aug. 8, 1927 3 Sheets-Sheet 1

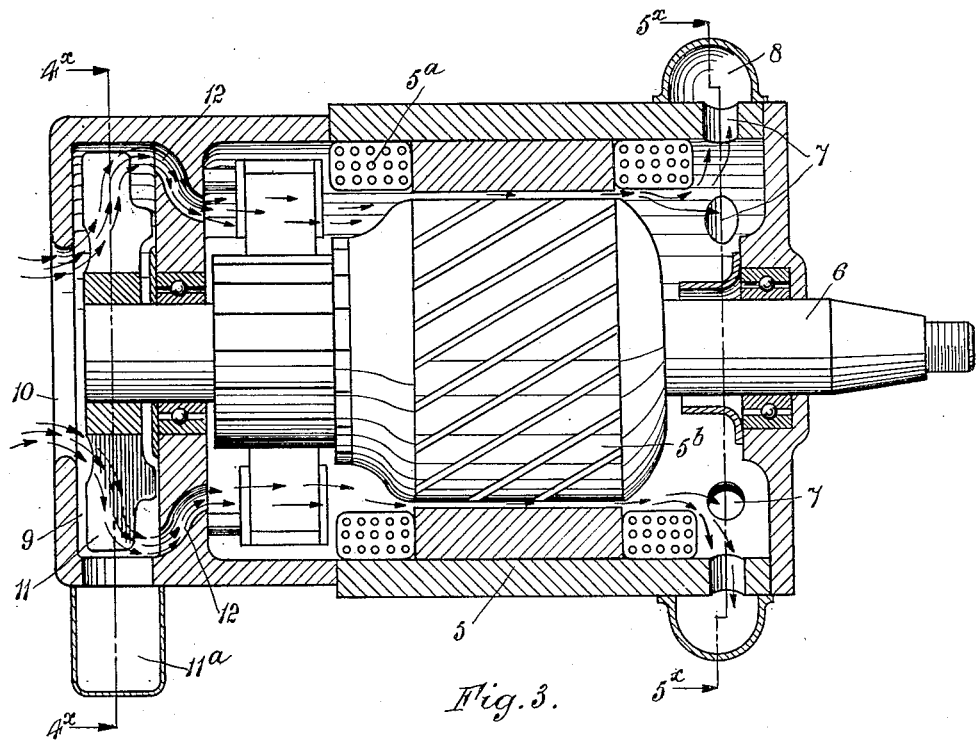
Fig. 3.
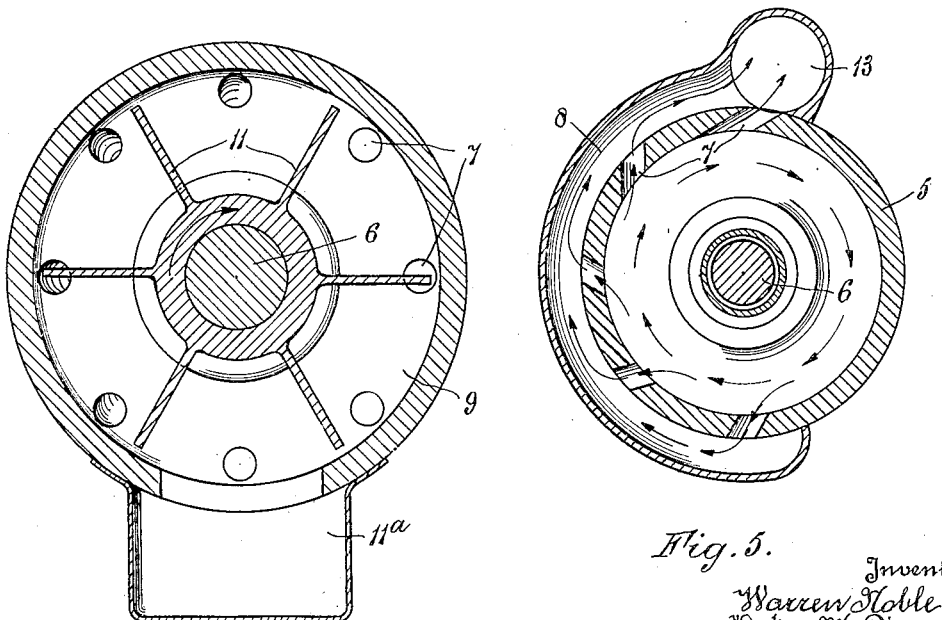
Fig. 4.
Fig. 5.
Inventors
Warren Noble.
Datus M. Pierson.

Patented Oct. 14, 1930

1,778,036

UNITED STATES PATENT OFFICE

WARREN NOBLE AND DATUS M. PIERSON, OF DETROIT, MICHIGAN, ASSIGNORS, BY MESNE ASSIGNMENTS, TO CHRYSLER CORPORATION, A CORPORATION OF DELAWARE

VENTILATING SYSTEM

Application filed August 8, 1927. Serial No. 211,596.

This invention relates to internal combustion engines and more particularly to the combination of certain auxiliaries thereof as an air circulatory system whereby the said auxiliaries lend aid to one another in performing certain desirable functions and increasing their efficiency without complication, and permit an appreciable reduction of auxiliary weight as a result of the combination.

An important object of the said invention is to provide for the utilizing of one of the auxiliaries, namely, the generator of an engine as part of an air circulatory system in combination with charge-forming means and air cleaning means whereby, in such combination, air flow through the air cleaning means and the generator is indicated by the said charge-forming means, and the said charge-forming means is accordingly employed in the cooling of the windings of the generator, permitting a reduction in the size of the said generator beyond that ordinarily obtained in internal combustion engine practice, and also obtaining a more efficient charge-forming function in the charge-forming means due to the heating of the air flow by said generator windings.

Still further the said invention has for its object to provide for the combination with a generator of an air cleaner whereby cooling air is cleaned before entering the generator and the brushes and commutator of the generator kept free from dirt and grit; and has as a further object the connection of said generator combination with the charge-forming means of an engine whereby such charge-forming means will utilize the air flowing through the generator and will benefit from the cleaning function of the air cleaner and the heating function of the windings of the generator coils without the necessity of the use of a further air cleaner or separate heating means.

Still further the invention contemplates in an engine having a generator, a ventilating crankcase, and an air cleaner cleaning air entering said crankcase, the interposing of the generator between the air cleaner and the crankcase so that cleaned air will pass through the casing of the generator to the crankcase for the cooling of the generator windings and the protection of the brushes of the commutator of the generator against fouling by dirt or grit in the air stream; and still further the said invention contemplates the connecting of the air inlet of charge-forming means of the engine with the crankcase in such manner suction of the engine will operate to induce air flow through the crankcase and through the generator and air cleaner.

Still further objects or advantages subsidiary or incidental to the aforesaid objects, or resulting form the construction or operation of the invention as it may be carried into effect, will become apparent as the said invention is hereinafter further disclosed.

In carrying the invention into effect, we may combine the auxiliaries, namely, the carburetor, the generator and the air cleaner of an internal combustion engine in an air circulating unit wherein the generator is applied to the charge-forming device of the engine in such manner that the suction of the engine induces an air flow through the casing of the generator, and the air cleaner is applied to the generator in such manner that it cleans air entering the said generator, the air flow cooling the windings of the said generator and incidentally being heated thereby, and the air flow being conducted from the generator to the charge-forming device by way of the crankcase of the engine so that clean ventilation of the crankcase is provided for.

The said invention is more particularly described and ascertained hereinafter, by way of example, having reference to the accompanying drawings, wherein:—

Figure 3 is a detail sectional view of the unitary air cleaner and generator employed in the arrangement illustrated in Figure 2;

Figure 4 is a transverse sectional view taken on the line 4×—4× of Figure 3;

Figure 5 is a transverse sectional view taken on the line 5×—5× of Figure 3;

Similar characters of reference indicate similar parts in the several figures of the drawings.

Figure 2:
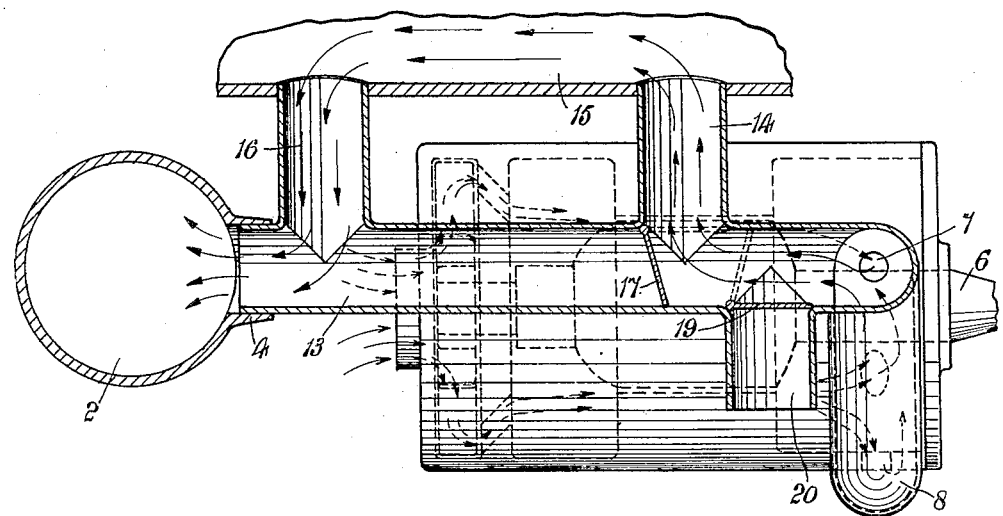
Figure 2 is a sectional plan on a larger scale taken on a plane indicated by the line $2^x$—$2^x$ of Figure 1.

The engine 1 illustrated is of the type provided with a charge-forming device in the form of a carburetor 2 connected to an intake manifold 3 and having an air intake connection 4 through which air is admitted for a mixture with fuel in the carburetor; although it is not essential to this invention that this form of charge-forming device be employed, the said invention being generally applicable to any charge-forming device into which an air supply is induced.

5 is a generator mounted on the engine block, the generator shaft 6 being driven from the engine as usual. It is desirable that the windings of the said generator be cooled in order that the size of the windings may be reduced and the weight of the generator correspondingly reduced; and it is proposed to utilize the air supplied to the charge-forming device as the cooling medium for the generator windings and incidentally to utilize the heat so dissipated from the generator windings as the means of heating the air supplied to the charge-forming device. For such reason we provide air outlet openings 7 in one end of the generator casing and a walled passage 8 into which air may pass through the said openings from the generator casing, this passage being extended in a pipe 13 to the intake connection 4 of the charge-forming device.

It is also desirable that the brushes and armature of the generator be protected from access thereto of dirt and grit, and within the outlet end of the said generator casing is formed a chamber 9 having an air inlet opening 10 thereto and accommodating an air cleaner 11, in this case mounted for positive operation on the generator shaft 6, 12 being air passages leading from the chamber 9 to the interior of the body of the generator casing which houses the field and armature windings 5ª and 5ᵇ. Thus, when the engine is in operation the suction thereof induces a flow of air through the cleaner 11, about the windings of the generator, and into the charge-forming device 2. 11ª is a dust receptacle attached to the generator to receive foreign matter separated from the air by the cleaner 11.

It is further proposed and is an important object of the invention to utilize the arrangement described in connection with the ventilating of the crankcase of the engine 1 so that the benefits of the cleaned air may be fully made use of, the necessity for preventing admission of dust and grit into the crankcase being well appreciated; and to such end we illustrate the air pipe 13 as having a branch 14 leading to the crankcase 15, and a further branch 16 leading from the crankcase back to the said pipe 13, 17 being a valve interposed in the pipe 13 between the branches 14 and 16.

The adjustment of this valve, such as by means of the lever 18 determines the path of the air to the charge-forming device, which path may be entirely through the crankcase or directly through the pipe 13, or partially by way of the crankcase and pipe 13, as may be desired. 19 is a further valve operating relative to another branch 20 which opens from the pipe 13 in advance of the pipe 14 directly to the atmosphere, and this valve 19 may be operated as a choke by means of the lever 21, if so desired. It will be seen that the suction induced by the engine is the means of ventilating the crankcase and the generator windings, and the means of cleaning the air supplied to the crankcase also protects the generator and charge-forming device from the ingress of dust and grit, the generator windings operating as a heater for the air supplied to the charge-forming device.

Figure 7:
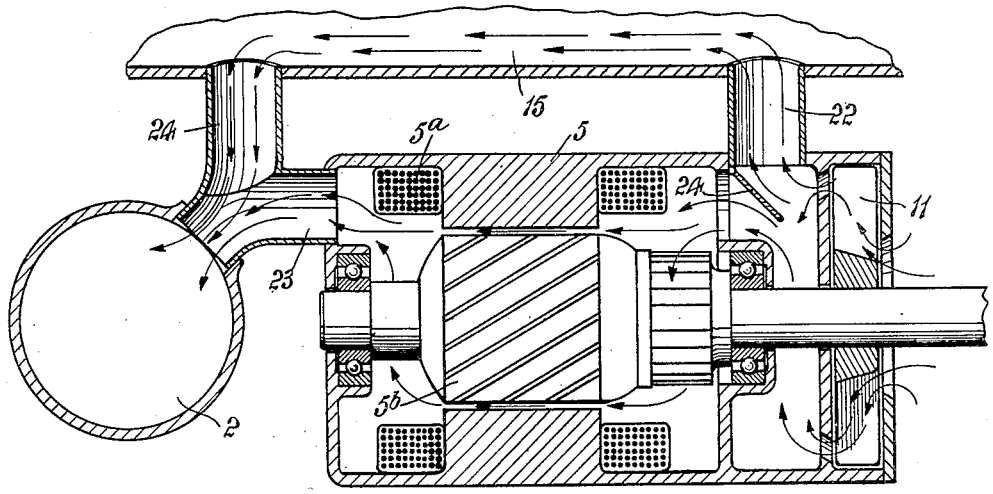
Figure 7 is a detail sectional plan of the same.
Figure 6:
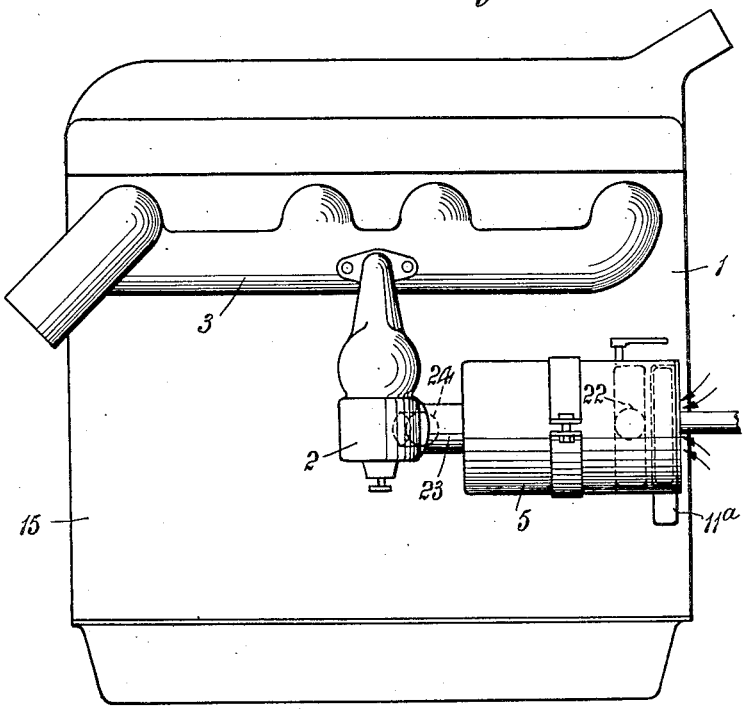
Figure 6 is a similar view to Figure 1 illustrating a modified arrangement of the connections between the generator and charge-forming device of the engine.

In the modified arrangement, Figures 6 and 7, an air pipe 22 corresponding to the pipe 14 is shown leading from the casing of the generator beyond the air cleaner 11, but in this case in advance of the generator proper, to the crankcase 15, and 23 is a pipe or air conveyor extending from the outlet end of the generator to the charge-forming device 2, this pipe corresponding to the air pipe 13. A branch pipe 24 leads from the crankcase to the said pipe 23 in the manner of the branch pipe 16 of Figures 1 and 2.

Figure 1:
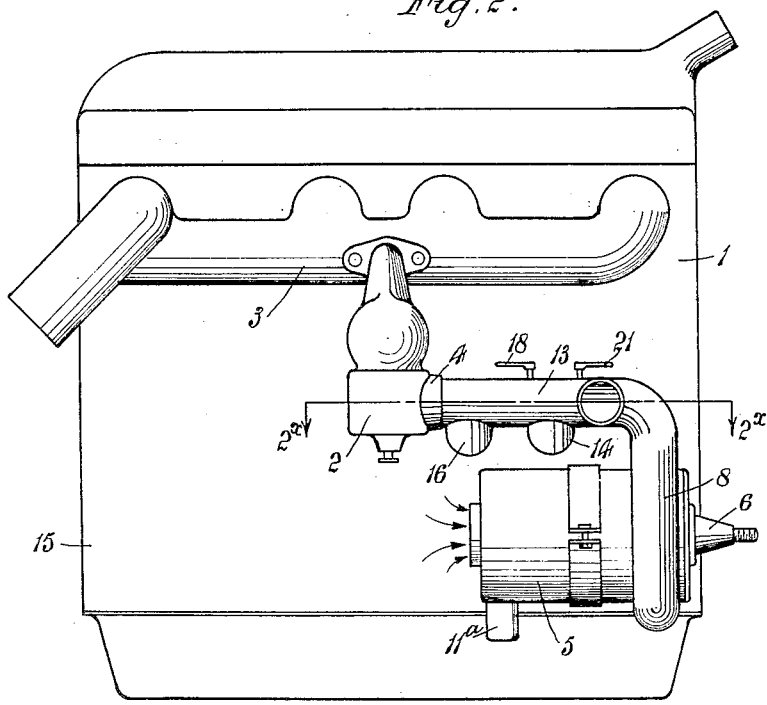
Figure 1 is an elevation, more or less diagrammatic, of an internal combustion engine illustrating an application thereto of the said invention.

24 is a valve operating in the manner of the valve 17 adjustable to direct air through the crankcase to the charge-forming device or through the generator to the charge-forming device, or partly through the crankcase and partly through the generator as may be desired, the arrangement differing from that shown in Figures 1 and 2 in that the air shunted through the crankcase does not pass through the generator proper. This is a very satisfactory arrangement for general combustion engine practice.

From an engine manufacturing standpoint, the invention has the advantages of lightening the accessory weight and improving the accessory operation as well as improving the efficiency of the charge-forming device and the consequent operation of the engine.

Herein and in the claims the term "charge-forming device" is to be deemed to refer to a carburetor or other such auxiliary of an internal combustion engine wherein the charge is formed externally to the cylinders thereof, or the cylinders themselves wherein the charge is formed in the cylinders.

The arrangement described admits of the use of any suitable type of air cleaner, mechanically operated as illustrated or otherwise, many of which are well known in the air cleaning art, and the invention is not restricted only to air cleaners of the fan or centrifugal type.

The invention may be developed within the scope of the following claims without departing from the essential features of the said invention, and it is desired that the specification and drawings be read as being merely illustrative and not in a limiting sense, except as necessitated by the prior art.

What we claim is:—

1. In combination with an internal combustion engine a generator having an air passage therethrough to which the windings of said generator are exposed, said internal combustion engine having suction inducing means connected to one end of said passage, and air cleaning means through which air enters the other end of said passage.

2. In combination with an internal combustion engine having a charge-forming device, a generator having a passage therethrough to which the windings of said generator are exposed, air-conveying means connecting one end of said passage with the air inlet of such charge-forming device, and air cleaning means through which air enters the other end of said passage.

3. In combination with an internal combustion engine having a charge-forming device, means for cleaning air supplied to said charge-forming device, and a generator interposed between said means and said charge-forming device whereby said air flows through said generator.

4. In combination with an internal combustion engine having a charge-forming device, a generator having inlet and outlet means at opposite ends thereof, an air cleaner at the inlet end of said generator and air-conveying means connecting the outlet end of said generator to said charge-forming device.

5. In combination with an internal combustion engine having suction side, a generator provided with an air inlet and outlet at opposite ends thereof, an air cleaner at the inlet end of said generator, and air-conveying means connecting the outlet end of said generator to the suction side of said engine.

6. In combination with an internal combustion engine, a crankcase, a charge-forming device, an air inlet to said crankcase, a generator having air cleaning means associated therewith and a passage therethrough to which the windings of said generator are exposed, means for directing air from said generator to said crank case, and means for directing cleaned air from said crankcase to said charge-forming device.

7. A combination according to claim 6, including an air conveyor from said cleaning means to said charge-forming device and adjustable means for determining the path of air from said cleaning means to said charge-forming device or through said crankcase.

8. In combination with an internal combustion engine, a crankcase, a charge-forming device, an air inlet to said crankcase, means for cleaning air entering said crankcase, means for directing cleaned air from said crankcase to said charge-forming device, and a generator having a passage therethrough to which the windings of said generator are exposed, said generator being interposed between said air cleaning means and said crankcase.

9. In combination with an internal combustion engine having suction inducing means for drawing air into the engine, means for cleaning the air supplied to the engine by said suction inducing means, and a generator interposed between said air cleaning means and said suction inducing means whereby said air flows through said generator.

In testimony whereof we affix our signatures.

WARREN NOBLE.
DATUS M. PIERSON.